United States Patent [19]

Schilke

[11] Patent Number: 4,544,519
[45] Date of Patent: Oct. 1, 1985

[54] MACHINE AND METHOD FOR PRODUCING FOOTWEAR

[75] Inventor: Waldemar Schilke, Trenton, Canada

[73] Assignee: Bata Industries Limited, Batawa, Canada

[21] Appl. No.: 677,439

[22] Filed: May 22, 1984

Related U.S. Application Data

[63] Continuation of Ser. No. 421,430, Sep. 22, 1982, abandoned.

[51] Int. Cl.$^4$ ............ B29C 5/00; B29C 7/00; B29F 1/00
[52] U.S. Cl. .................... 264/328.1; 264/328.9; 264/328.14; 264/334; 425/547; 425/556; 425/564; 425/438; 425/444
[58] Field of Search ............ 425/444, 574, 575, 576, 425/436 R, 438, 547, 549, 554, 556, 562, 564, 548; 264/334, 328.1, 328.9, 328.14

[56] References Cited

U.S. PATENT DOCUMENTS

| | | | |
|---|---|---|---|
| 2,770,011 | 11/1956 | Kelly | 425/566 |
| 3,444,590 | 5/1969 | Ludwig | 425/575 |
| 3,732,055 | 5/1973 | Hujik | 425/308 |
| 4,123,493 | 10/1978 | Shilke et al. | 264/244 |
| 4,204,824 | 5/1980 | Paradis | 425/444 |
| 4,257,755 | 3/1981 | Lemelson | 425/168 |
| 4,302,169 | 11/1981 | DeOliveria | 425/119 |
| 4,465,448 | 8/1984 | Aldridge | 425/444 |

FOREIGN PATENT DOCUMENTS

| | | | |
|---|---|---|---|
| 2723815 | 7/1978 | Fed. Rep. of Germany | 425/129 S |
| 2819693 | 11/1978 | Fed. Rep. of Germany | 264/244 |
| 2907751 | 4/1980 | Fed. Rep. of Germany | 425/129 S |
| 2039463 | 8/1980 | United Kingdom | 425/129 S |

Primary Examiner—Willard E. Hoag

[57] ABSTRACT

A molding machine for producing footwear soles includes a frame carrying a pair of extruders for thermoplastic material at one end; a pair of bottom molds mounted on hot runner systems on the other end of the frame; a pair of vertically movable top molds mounted above and cooperating with the bottom molds to define mold cavities for receiving the thermoplastic material from the hot runner systems; a swing out system for swinging each top mold from a horizontal molding position to an unloading position; gripper jaws for gripping the soles and removing them from the top molds; and swing arm assemblies carrying the gripper jaws for carrying the soles away from the molds to conveyor or packaging locations.

9 Claims, 18 Drawing Figures

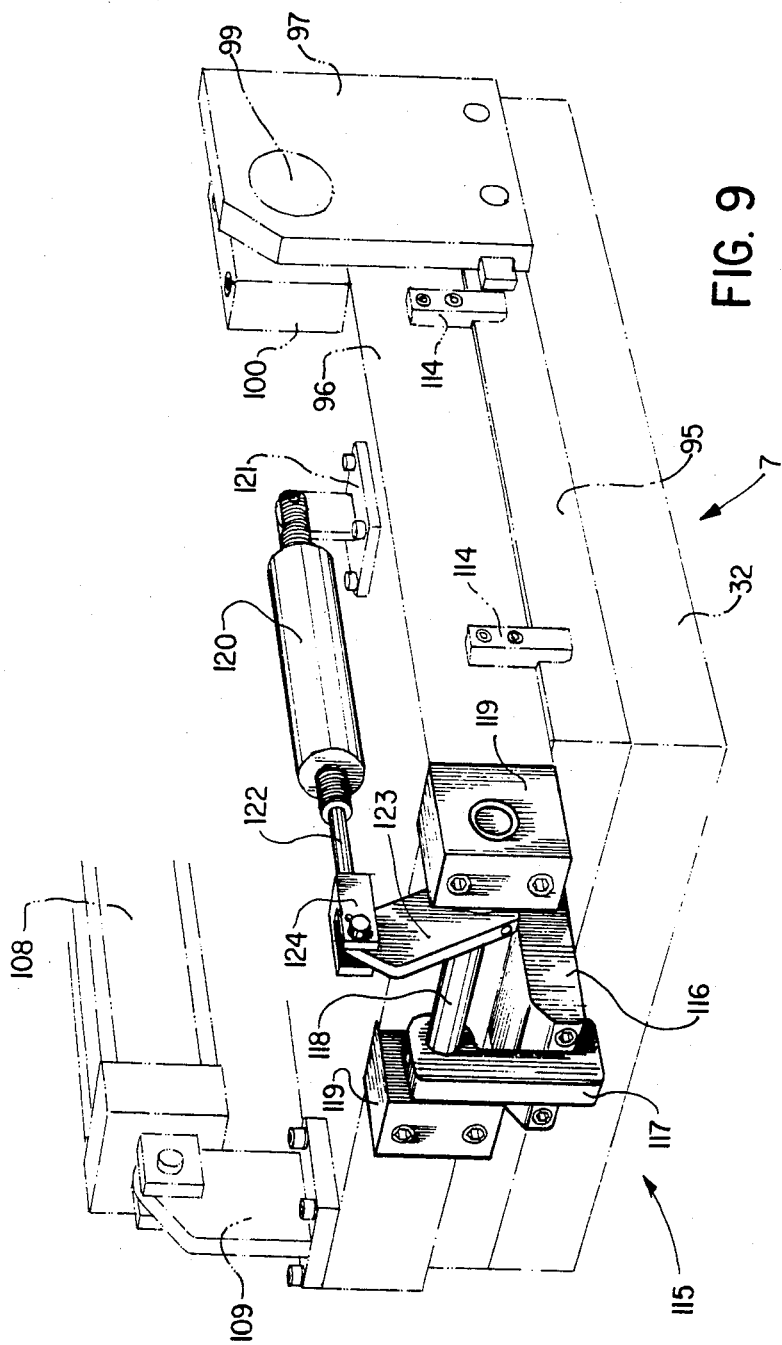

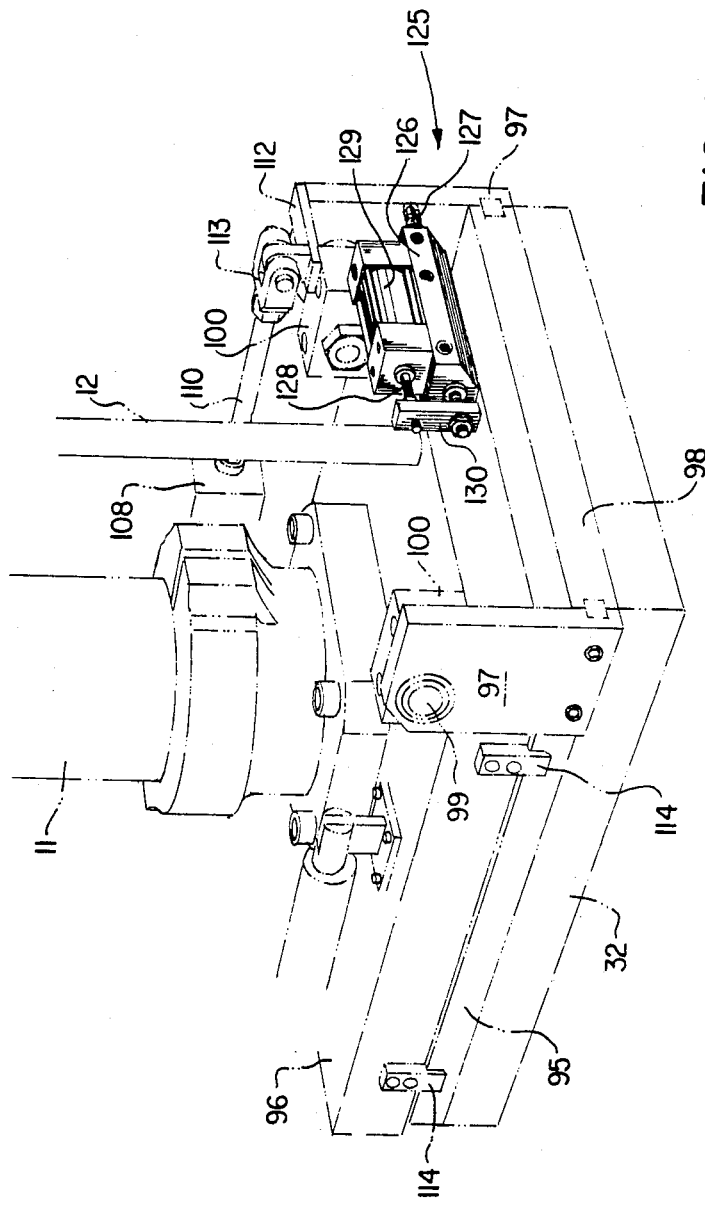

MACHINE AND METHOD FOR PRODUCING FOOTWEAR

This is a continuation of application Ser. No. 421,430, filed Sept. 22, 1982, and now abandoned.

BACKGROUND OF THE INVENTION

1. Field of the Invention

This invention relates to a method and an apparatus for producing footwear soles, and in particular to a method and a machine for molding footwear soles.

2. Discussion of the Prior Art

The method and machine of the present invention incorporate several important innovations, and represent developments of the apparatus and method disclosed in Canadian Pat. No. 900,116, issued to Bata Shoe Company of Canada Limited on May 16, 1972. When molding soles using the apparatus described in this patent, a large quantity of sprue is produced. The sprues must be removed by grippers and recycled or discarded. Moreover, the use of the apparatus is somewhat labor intensive. While the soles produced are wiped from the lower molds, they are not removed from the immediate vicinity of the apparatus, i.e. the finished soles must be carried away manually from the apparatus for further processing.

GENERAL DESCRIPTION OF THE INVENTION

An object of the present invention is to render the molding of footwear soles more automated. Accordingly, the present invention relates to a machine for molding footwear soles comprising:

(a) frame means for carrying a plastic extruder;
(b) bottom mold means mounted on said frame means;
(c) movable top mold means mounted on said frame means for cooperating with said bottom mold means to define a mold cavity for receiving plastic from said extruder for forming a footwear sole;
(d) means for moving said top mold means between a closed cavity forming position and an open position in which the molded sole is retained by said top mold means;
(e) gripper means for removing a sole from said top mold means; and
(f) transfer means carrying said gripper means for moving said sole from the vicinity of the top mold for further processing or packaging.

The invention also relates to a method of producing a footwear sole comprising the steps of:

(a) forming a mold cavity by moving a top mold assembly downwardly against a bottom mold assembly;
(b) injecting plastic material into said mold cavity to form the sole;
(c) opening the mold cavity by moving the top mold assembly upwardly away from the bottom mold assembly with the sole attached to said top mold assembly;
(d) gripping said sole and transferring the sole away from the top mold assembly for further processing or packaging.

By using a so-called hot runner device in the machine when molding with a thermoplastic material, the quantity of plastic used in the molding process is reduced, because the sprue normally formed is eliminated. A hot runner device is intended to keep the thermoplastic material in the fused state until the material enters the mold. Thus, the sprue normally associated with the molding of a thermoplastic material is eliminated. The usual hot runner systems include heating elements connected to and forming part of the mold. In the machine of the present invention, the hot runner device is not a part of the mold which substantially simplifies the mold structure and reduces mold production costs.

BRIEF DESCRIPTION OF DRAWINGS

The invention will now be described in greater detail with reference to the accompanying drawings, which illustrate preferred embodiments of the invention and wherein:

FIG. 9 is a perspective view of a top mold and a latch therefor;

FIG. 10 is a perspective view of the top mold and a safety lock therefor;

DESCRIPTION OF PREFERRED EMBODIMENTS

Basic Machine

Figure 1:
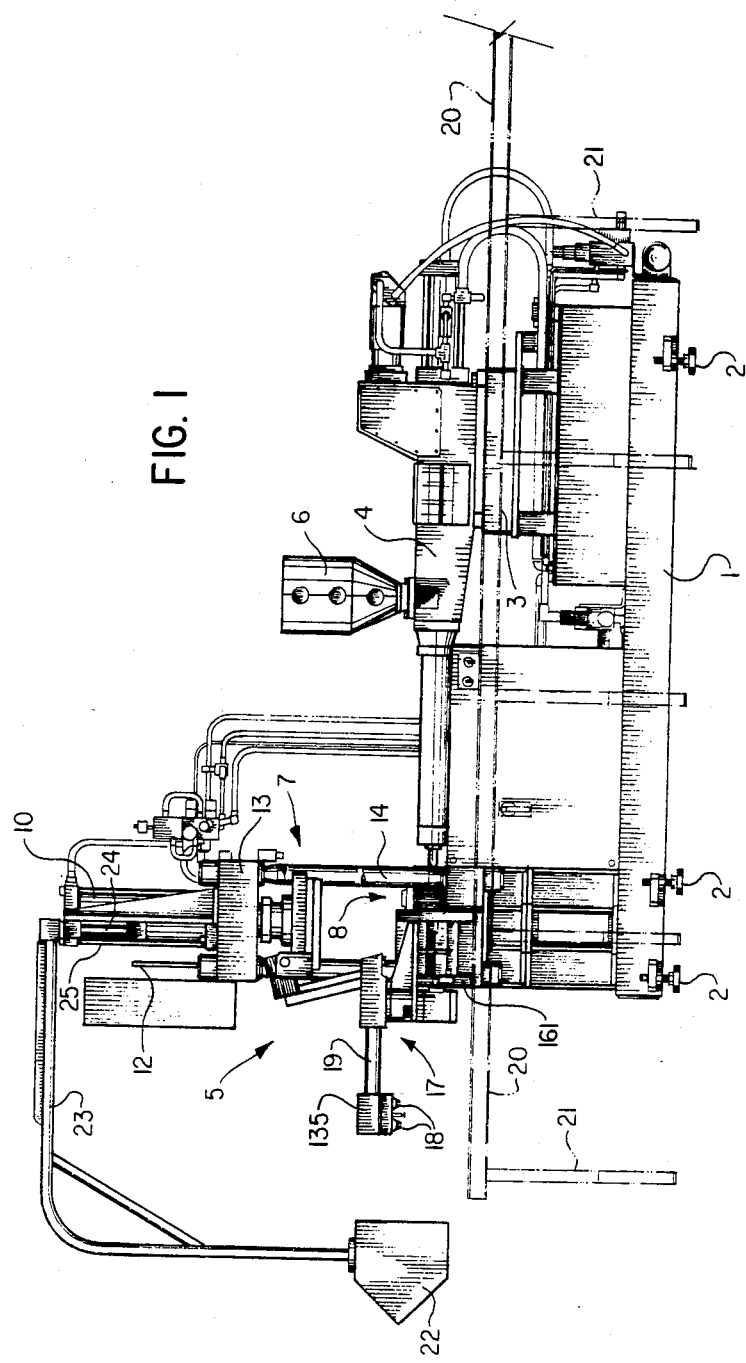
FIG. 1 is a side elevation view of a molding machine in accordance with the present invention showing a mold in the open position.
Figure 2:
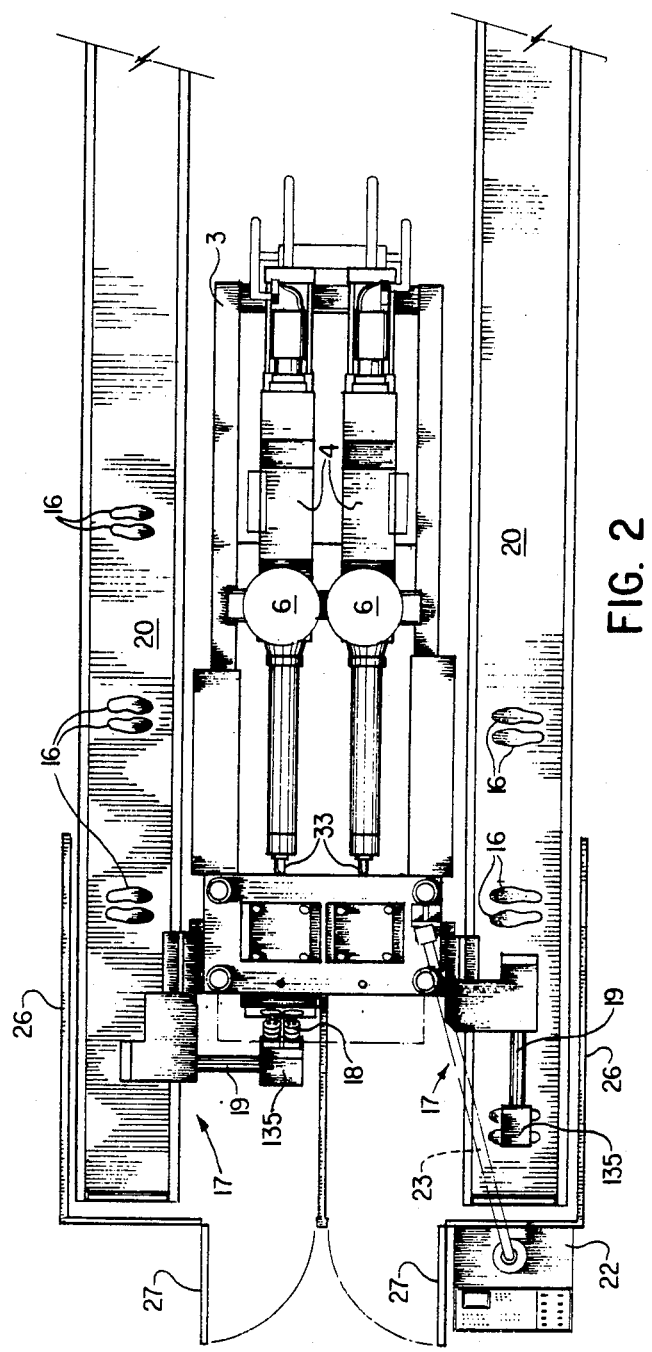
FIG. 2 is a plan view of the machine of FIG. 1.
Figure 3:
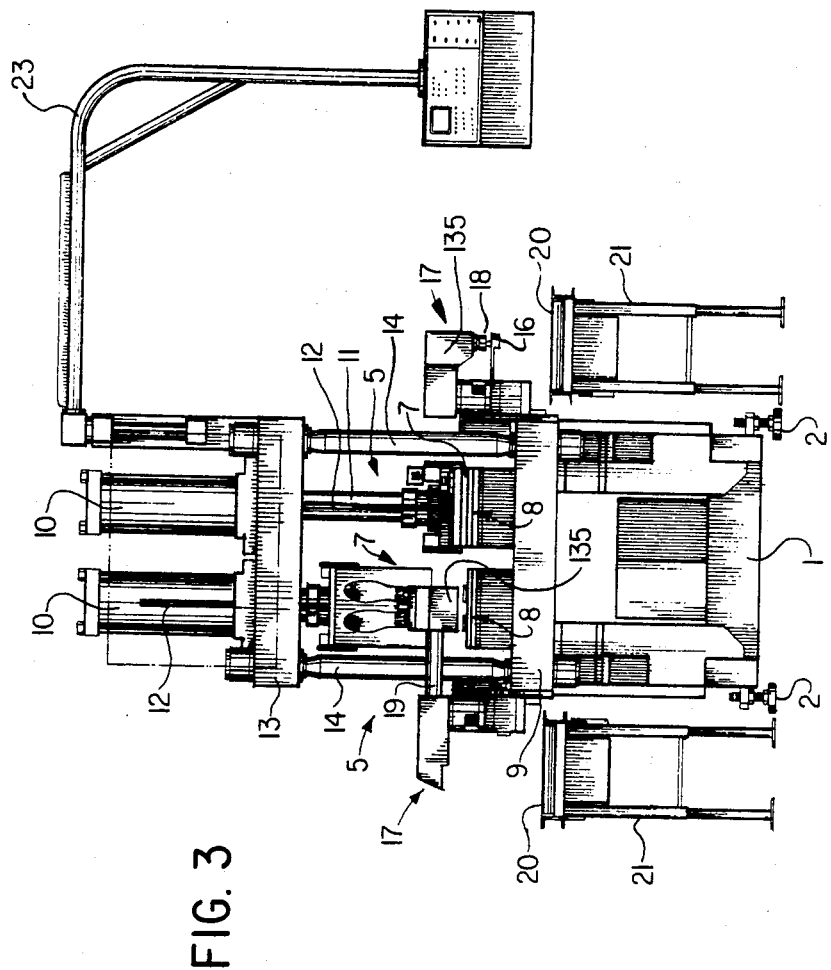
FIG. 3 is a front elevation view of the machine of FIGS. 1 and 2 with one mold open and one mold closed.

With reference to FIGS. 1 to 3, the molding machine of the present invention includes a generally rectangular frame 1 with adjustable feet 2. A carriage 3 carries a pair of extruders 4 at one end of the frame 1. The extruders 4 normally remain in position for injecting thermoplastic material into a pair of molds generally indicated at 5, but can be moved away from the molds for purging or servicing. A thermoplastic material, e.g. polyvinyl chloride or thermoplastic rubber is fed into the extruders 4 through hoppers 6.

Each of the molds 5 (FIG. 3) includes a movable top mold assembly 7 and a fixed bottom mold assembly 8. The bottom mold assembly 8 is mounted on a table or platen 9. The top mold assembly 7 is moved vertically between a closed position (right mold—FIG. 3) and an open position (left mold—FIG. 3) by a large cylinder 10, the piston rod 11 of which is connected to the top mold assembly 7. The top mold assembly 7 is guided by a rod 12 extending upwardly through a fixed top platen 13, which is supported by posts 14. Soles 16 molded in the molds 5 are removed from the molds by automatic transfer devices generally indicated at 17 which include gripping devices 18, and swing arm assemblies 19 for transferring the soles 16 to conveyors 20. The soles 16 can also be transferred directly to containers (not shown) for packaging. The conveyors 20 are mounted on stands 21 parallel to the longitudinal axis of the frame 1 for conveying the soles 16 away from the machine for further processing or packaging. The operation of the machine, including the extruders 4 is controlled simply using a console 22 mounted on the outer end of a boom 23 at the mold end of the machine. The boom 23 is rotatably mounted on the frame 1 by means of a post 24 in a bracket 25. Panels 26 and doors 27 (FIGS. 1 and 2) are provided on the mold end of the machine for protecting the operator of the machine, Of course, the doors 27 permit access to the molds for servicing, etc.

Hot Runner System

Figure 4:
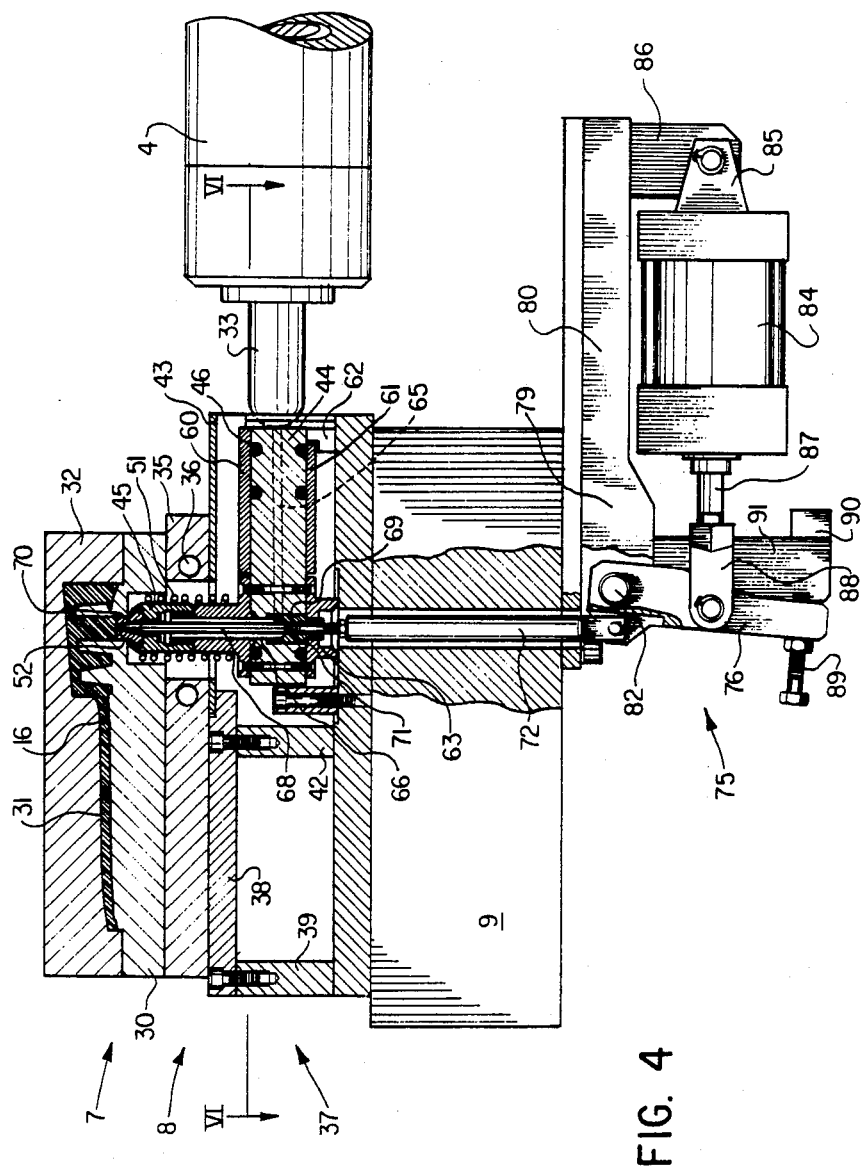
FIG. 4 is a longitudinal sectional view of a hot runner device used in the machine of FIGS. 1 to 3.
Figure 5:
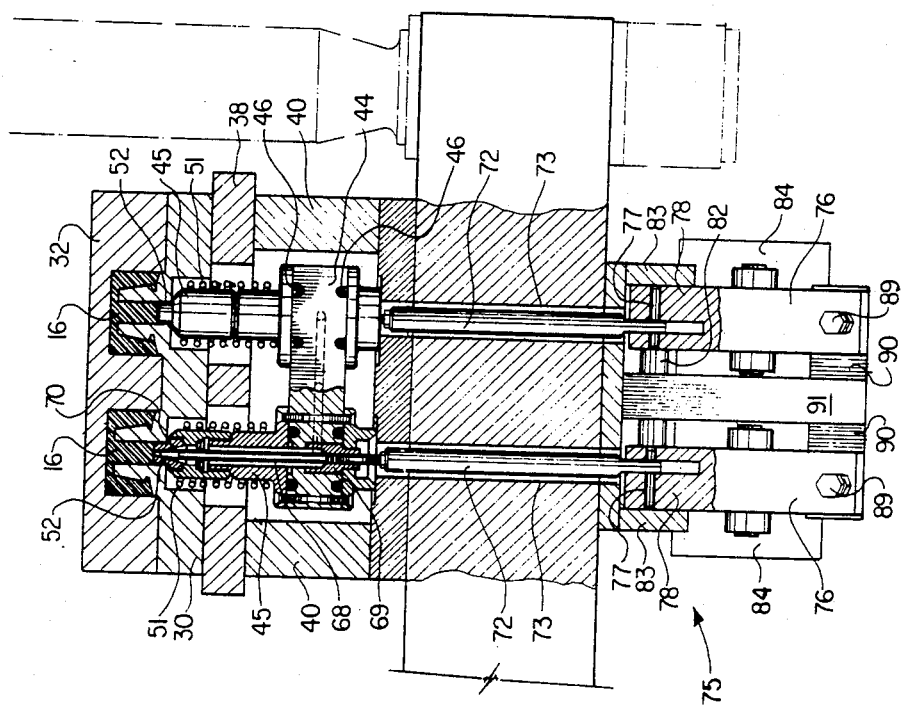
FIG. 5 is a cross-sectional view of the device of FIG. 4.
Figure 6:
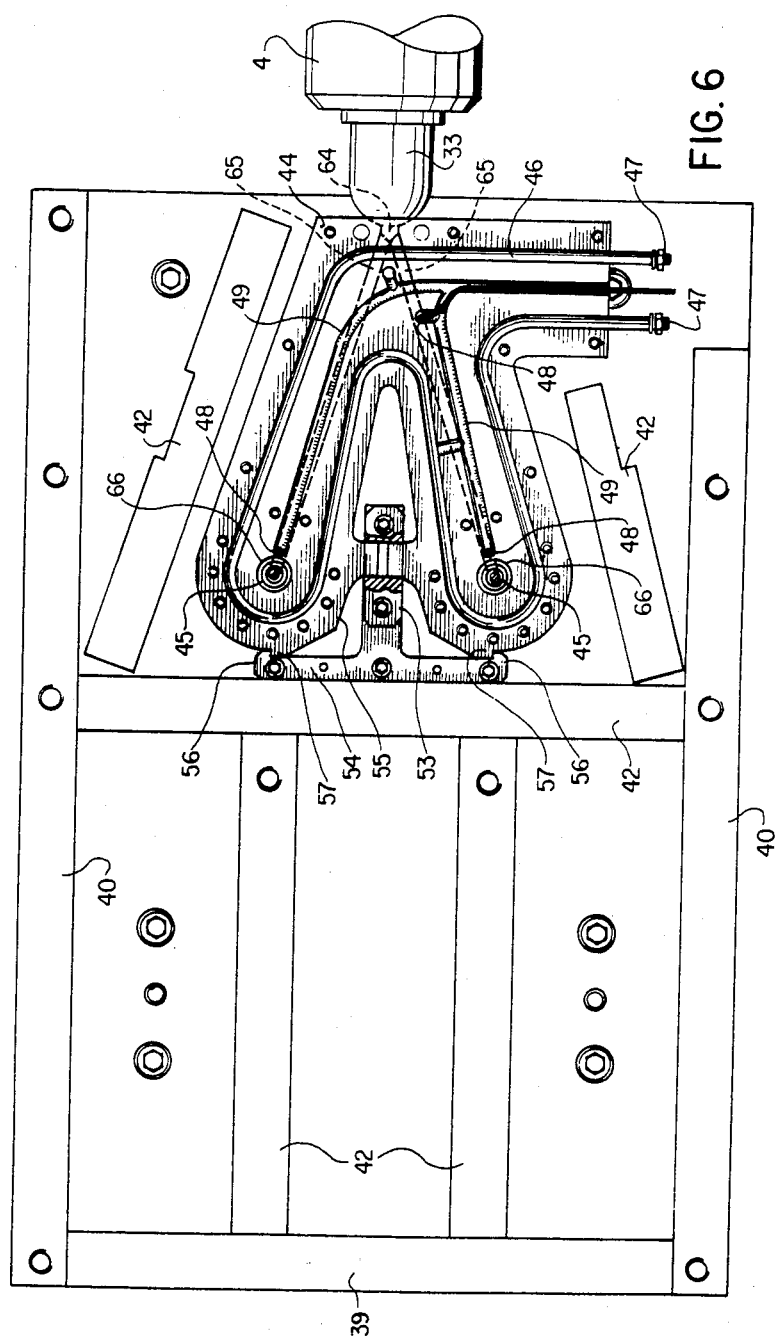
FIG. 6 is a cross section taken generally along line VI—VI of FIG. 4.

Referring now to FIGS. 4, 5 and 6, as mentioned hereinbefore, each bottom mold assembly 8 is fixedly mounted on the machine platen 9. Such bottom mold assembly 8 includes a bottom mold 30, which defines a mold cavity 31 with a top mold 32 for receiving a thermoplastic sole-forming material from a nozzle 33 of the extruder 4. The bottom mold 30 is mounted on a cooling plate 35 provided with a passage 36 for circulating coolant which ensures that the sole 16 hardens quickly for removal from the mold.

The bottom mold assembly 8 is mounted on a hot runner system generally indicated at 37, which keeps the plastic liquid until it enters the mold cavity 31. The hot runner system includes a casing defined by a top wall 38, an end wall 39, side walls 40 (FIG. 6), and partitions 42. The casing must be sufficiently strong to support the mold 5 under high molding pressures, and sufficiently open to prevent heat transfer. A cover plate 43 (FIG. 4) at one end of the casing permits access to the remainder of the hot runner system.

Plastic from the extruder 4 is fed into the mold cavity 31 through a heated manifold defined by a block 44 and tubular nozzle assemblies 45. The block 44 is generally V-shaped (FIG. 6) with U-shaped channels in the top and bottom surfaces thereof for receiving tubular heating elements 46. Ends 47 of each heating element 46 are threaded for connecting the elements to electrical leads (not shown). Thermocouples 48 are mounted in the top of the block 44 for controlling the temperature. The thermocouples 48 are mounted at the ends and vertex of a V-shaped channel 49 in the block 44. Heating coils 51 are provided around the nozzle assemblies 45 for ensuring that thermoplastic material therein remainds liquid until entering the mold cavity 31.

It is important to keep the nozzle assemblies 45 aligned with the injection ports 52 in the bottom mold 30. Accordingly, longitudinal and transverse stops 53 and 54, respectively (FIG. 6) are provided for retaining the block 44 and consequently the nozzle assemblies 45 in proper alignment. The longitudinal or front stop 53 is merely a post for engaging front end 55 of the block 44. The transverse stops 54 include hooks 56 for engaging vertical projections 57 on the front end 55 of the block 44 to prevent transverse spreading of the arms of the block. The stops 53 and 54 are on the longitudinal and transverse centre lines of the nozzle assemblies 45, preventing any movement due to heat expansion of the block 44. Contact between the stops 53 and 54, and the block 44 is kept to a minimum to keep heat transfer from the block 44 to the hot runner casing to a minimum.

The rear end of the block 44 is retained between top and bottom plates 60 and 61, respectively. The bottom plate 61 is supported on the casing bottom wall by a post 62. Sleeves 63 support the front end of the block 44. The sleeves 63 have bevelled bottom ends for further reducing contact with the casing, and consequently heat transfer. The hot runner structure described to this point ensures minimum heat transfer, so that heat is applied only to those elements requiring such heat, and heat transfer to the remainder of the machine is kept to a minimum.

Plastic enters the rear end of the block 44 via an inlet opening 64, and passes through horizontal passages 65 to vertical passages 66 in the block 44 to the nozzle assemblies 45. Each nozzle assembly 45 contains a valve including an elongated rod or valve stem 68 slidably mounted in a bushing 69 in the block 44. The top end of the valve stem 68 is tapered for mating with a correspondingly tapered injection orifice 70. Annular sealing grooves 71 are provided in the bottom end of the valve stem 68. The grooves are filled with plastic during injection to seal the stem 68 in the bushing which prevents leakage of molten plastic between the bushing and the valve stem. The valve stem is reciprocated in the passage 66 by tubular rod 72 connected to the bottom end of the valve stem 68 and extending downwardly through holes 73 in the platen 8 to a lever mechanism generally indicated at 75.

The lever mechanism 75 includes a pair of levers 76 connected to the rods 72 by pins 77 extending through the bifurcated upper end 78 of the levers 76 and through the bottom ends of the rods 72. The levers 76 are pivotally mounted for rotation around a horizontal axis on the front end 79 of a bracket 80. A pivot pin 82 extends between downwardly extending sides 83 of the bracket 80 for rotatably supporting the levers 76. A pair of cylinders 84 are also mounted on the bracket 80. A clevis 85 on the rear end of each cylinder 84 pivotally connects the cylinder to an arm 86 extending downwardly from the rear end of the bracket 80. A piston rod 87 extends outwardly from the front end of each cylinder 84, and the front end of the rod is pivotally connected to one of the levers 76 by a clevis 88. Thus, extension of retraction of the rod 87 causes closing or opening, respectively, of the injection orifice 70. Upward or closing movement of the valve stems 68 is limited by stop bolts 89 extending through the bottom end of each lever 76. The bolts 89 engage the ends of a horizontal arm 90 of an inverted T-shaped support 91, which extends downwardly from the bracket 80. By adjusting the bolts 89, the degree of opening of the valve stems 68 can be altered to change the mold filling characteristics.

Top Mold Assembly

Referring now to FIGS. 7 to 10, each top mold assembly 7 includes the top mold 32, which is connected to a cooling plate 95. The top mold 32 and the cooling plate 95 are pivotally mounted on a vertically movable platen 96, which is connected to the bottom end of the piston rod 11 of the cylinder 10. A pivot plate 97 is connected to each side of the front end 98 of the cooling plate 95. A pin 99 extends through the top end of each plate 97 into a block 100 on each side of the top of the platen 96 for pivotally supporting the top mold 32 and the cooling plate 95 for rotation around a horizontal axis defined by the pins 99. Thus, the top mold 32 can be rotated from a horizontal position to a substantially vertical position (approximately 15° from the vertical), as described hereinafter in greater detail.

Figure 8:
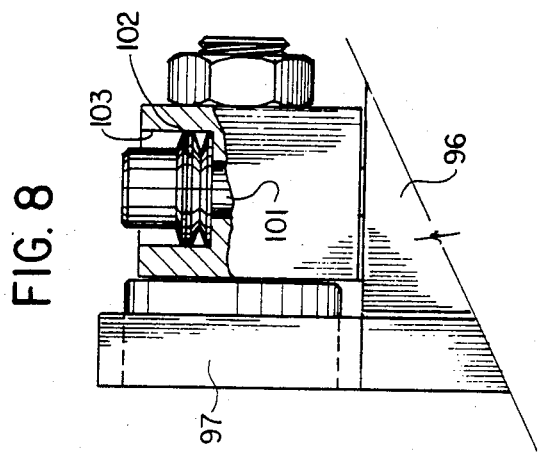
FIG. 8 is a partly sectioned end view of a post used in the assembly of FIG. 7.
Figure 7:
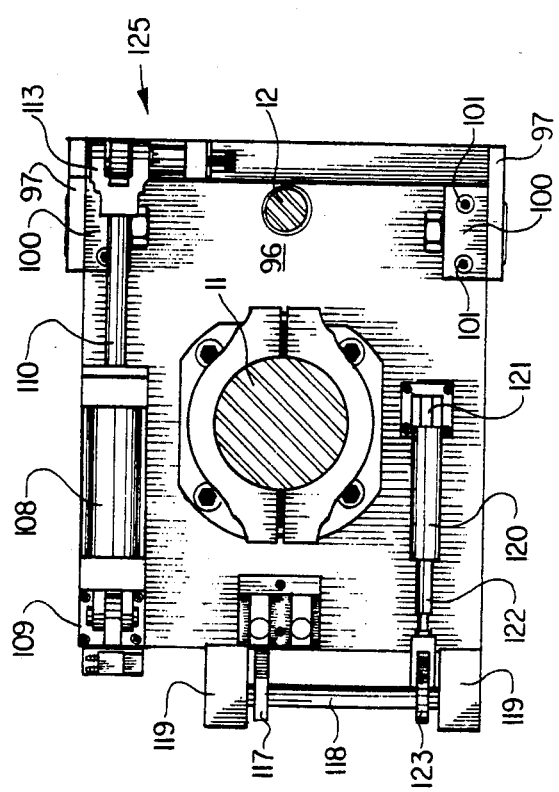
FIG. 7 is a plan view of a swivel assembly for the top mold assembly of the apparatus of FIGS. 1 to 3.

As shown in FIG. 8, the block 100 is connected to the platen 96 by a pair of bolts 101 and disc springs 102 sandwiched between the head of each bolt 101 and a countersunk recess 103 in the block 100. Thus, there is a 0.030" gap between the block 100 and the platen 96 when the top mold 32 is in the closed position against the bottom mold. When the pressure on the top mold 32 is released, i.e. when the top mold 32 is moved away from the bottom mold 39, the springs 102 press the block 100 down, so that the gap is between the platen 96 and the cooling plate 95, (FIG. 10) which facilitates rotation of the top mold 32 and cooling plate 95.

Rotation of the top mold 32 is effected by a swing out cylinder 108 (FIGS. 7, 9 and 10), the rear end of which is pivotally connected to a post 109 on the rear end of the platen 96. A piston rod 110 extends forwardly from the cylinder 108 and is pivotally connected to an arm 112 extending inwardly from one of plates 97 by a clevis 113. Retraction and extension of the piston rod 110 causes opening and closing, respectively of the top mold 32, i.e. swinging movement of the top mold from the horizontal to the vertical position and vise versa. The cooling plate 95 is guided into position against the platen 96 by guide lugs 114 extending downwardly from the platen.

During molding, the top mold 32 is locked in the closed (horizontal position) against the platen 96 by a latch generally indicated at 115 (FIG. 9) on the rear end of the platen 96. The latch 115 includes a lug 116 extending outwardly from the rear end of the cooling plate 95. The lug 116 is engaged by a hook 117, which is mounted on a shaft 118 extending between a pair of blocks 119 on the rear end of the platen 96. The shaft 118 and the hook 117 are rotated from the latched position to the release position by a cylinder 120 when air is supplied to the cylinder. A spring (not shown) in the cylinder 120 returns the hook 117 to the latch position. The rear end of the cylinder 120 is pivotally mounted on a post 121 on the platen 96. A piston rod 122 extending outwardly from the other end of the cylinder 120 is pivotally connected to the top end of a lever 123 by a clevis 124. The lever 123 is fixedly connected to the shaft 118, so that retraction of the piston rod 122 causes the hook 117 to release the lug 116 and consequently the cooling plate 95 and the top mold 32.

A safety lock generally indicated at 125 (FIG. 11) for the top mold assembly prevents closing of the top mold if the doors 27 are open. The lock 125 is mounted on the front end of the platen 96 and includes a block 126 in which a pin 127 is slidably mounted. The pin 127 normally abuts one of the plates 97. When the top mold 32 and cooling plate 95 swing out the pin 127 remains retracted in the block 126. The pin 127 is connected to the piston rod 128 of an air cylinder 129 mounted on the block 126 by a plate 130. If one of the doors 27 (FIG. 2) is opened, a spring (not shown) in the cylinder 129 pushes the pin 127 behind the plate 97 to hold the top mold 32 and the cooling plate 95 in the swung out position. As soon as the door 27 is closed, air is supplied to the cylinder 129 to retract the pin 127, allowing the top mold 32 to swing in to the closed position. Thus, the possibility of injury to the operator is reduced.

Gripping Device

Figure 11:
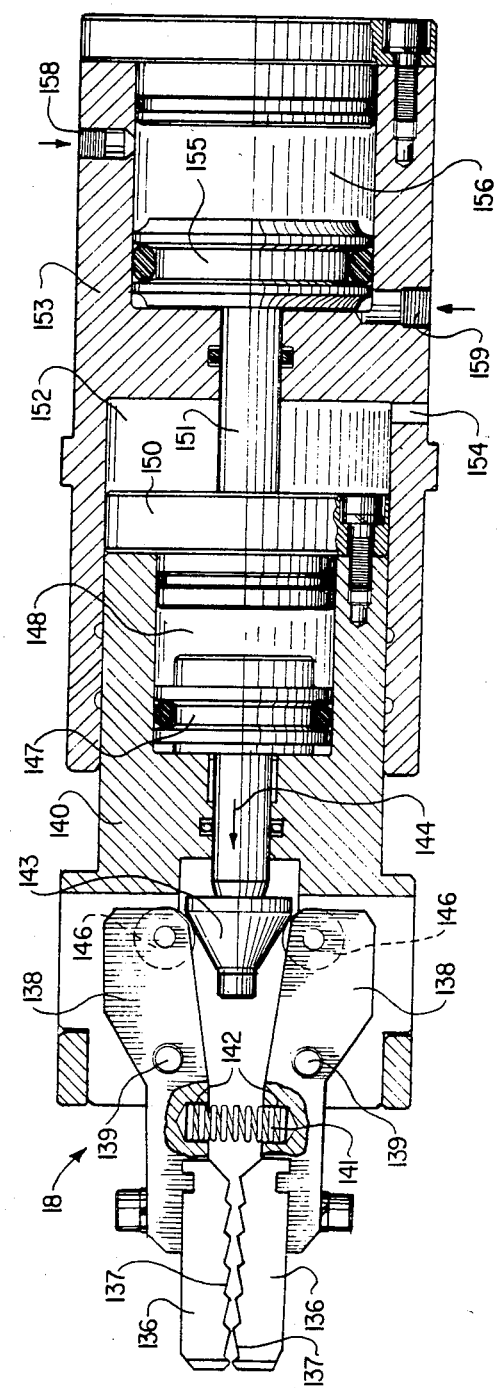
FIG. 11 is a longitudinal sectional view of a gripping device used in the machine of FIGS. 1 to 3.
Figure 12:
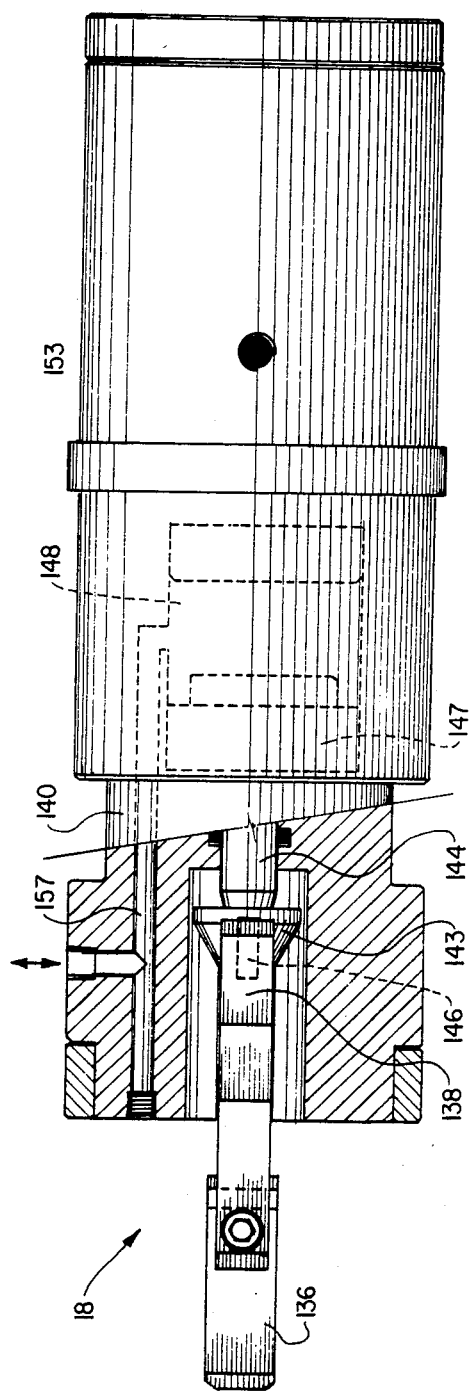
FIG. 12 is a partly sectioned side view of the device of FIG. 11.

After the top mold 32 has been swung out, (FIG. 1) each sole 16 is gripped by a gripping device generally indicated at 18 (FIGS. 1, 11 and 12). A pair of gripping devices is mounted in the rectangular bracket 135 on one end of the arm 19. Each gripping device 18 includes a pair of jaws 136 with opposed serrated inner edges 137. The inner ends 138 of the jaws 136 are pivotally mounted on pins 139 in a generally cylindrical casing 140. The outer, gripping ends of the jaws 136 are biased apart by a helical spring 141 extending between opposed recesses 142 in the jaws. The jaws 136 are closed by a frusto-conical plunger 143 on the outer end of a piston rod 144. The plunger 143 slides between and presses against rollers 146 mounted in the inner opposed ends of the jaws 136. The inner end of the piston rod 144 is connected to a piston 147, which is slidably mounted in a chamber 148. The inner end of the chamber 148 is closed by a cover 150, which is attached to one end of another piston rod 151. The piston rod 151 and consequently the entire casing 140 are slidable in a chamber 152 in one end of a larger casing 153. A vent 154 is provided in the chamber 152. The rear end of the piston rod 151 is connected to a double acting piston 155 slidably mounted in a chamber 156 in the casing 153. The casing 140 is provided with an air inlet 157 (FIG. 12). The air inlet 157 is also used for venting the chamber 148 to atmosphere. Air inlets 158 and 159 are provided for introducing air into and venting the chamber 155 for extending or retracting the piston rod 151.

When air is introduced into the chamber 148 via inlet 157, the plunger 143 moves outwardly to close the jaws 136. When air is vented from the chamber 148 through the inlet 157, the spring 141 forces the jaws 136 open and returns the plunger to the retracted position.

When air is introduced into the chamber 156 via inlet 158, the piston 155 and consequently the casing 140 move outwardly to extend the jaws 136 for gripping a sole 16. When air is introduced into the inlet 159 and vented through inlet 158, the jaws 136 are retracted with the casing 140, piston rod 151 and piston 155.

Operation

Figure 15:
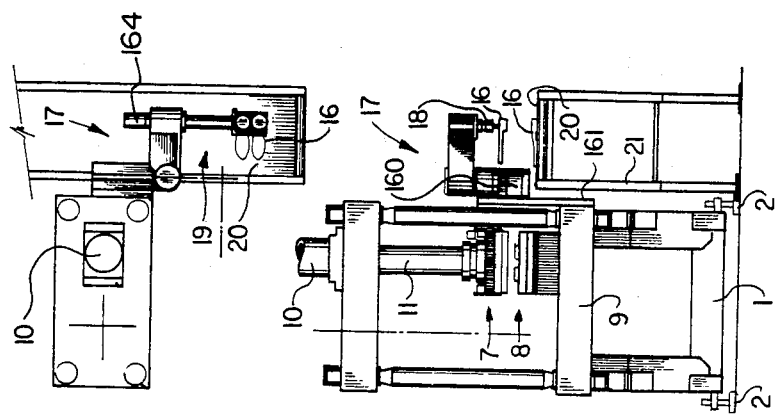
FIGS. 13 to 15 are schematic plan and front elevation views of the portions of the machine of FIGS. 1 to 12 in operation.
Figure 14:
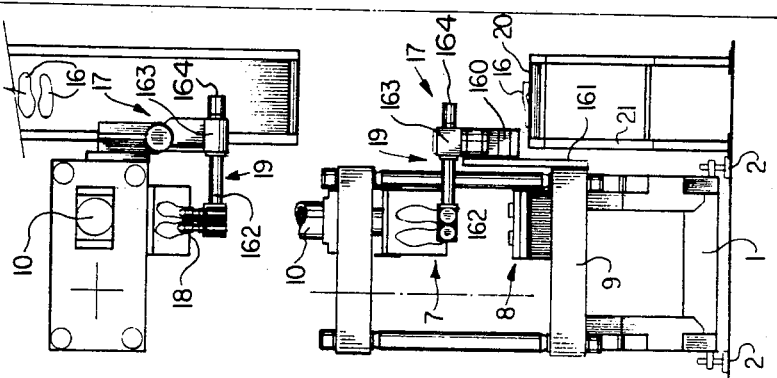
Figure 13:
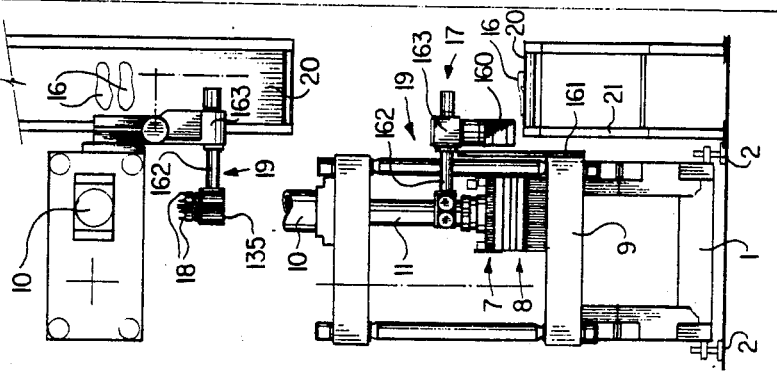

Referring now to FIGS. 13 to 15, the operation of the machine will be described. It will be appreciated that the operation of one half only of the machine is described, the operation of the other half being the same.

With the extruder 4 in position and the mold 5 closed, thermoplastic material is injected through the hot runner system 37 into the mold 5 to form a sole 16. Each mold 5 contains a pair of mold cavities 31, so that two soles 16 are molded simultaneously in each mold 5. Of course, during molding, the top mold 32 and cooling plate 95 are locked in position against the platen 96 and the entire top mold assembly 7 is clamped against the bottom mold assembly 8 by the clamping cylinder 10.

During the molding step, the gripping devices 18 are swung into position in front of the mold 5 (FIG. 13). For such purpose, the automatic transfer device 17 of the machine includes the swing arm assemblies 19, which are rotatably mounted on rotary actuators 160 for rotation around a vertical axis. Each actuator 160 is mounted on a bracket 161 (FIG. 1) for vertical sliding movement on the machine frame 1. Vertical adjustment is required for different molds, i.e. depending on the mold size, the location of the portion of the sole to be gripped may vary. Arm 162 of the swing arm assembly, carrying the bracket 135, is rotatably mounted in a sleeve 163 for rotation around a horizontal axis. Such rotation is effected using a rotary actuator 164. Upon completion of molding step, the clamping cylinder 10 and the piston rod 11 raise the top mold assembly 7 (FIG. 14). The cooling plate 96 and the top mold 32 are swung forwardly (FIGS. 1 and 14). The casing 140 of each of the gripping devices 18 is already extended and the jaws 136 are closed to grip the soles 16. The soles 16 include a hollow heel with cruciform partitions, which are gripped by the jaws 36. At the same time as gripping, the soles 16 are ejected in the conventional manner using air and ejector pins (not shown). The jaws 136 with the soles 16 are retracted by supplying air to the chamber 156 through inlet 159. The swing arm assembly 19 is swung through approximately 90° to position the soles 16 over the conveyor 20. The arm assembly 19 is rotated 90° so that the grippers 18 point downwardly. The jaws 136 are opened and the soles 16 are dropped onto the conveyor 20. As mentioned previously, the soles 16 can also be dropped into cartons (not shown) or other containers for shipping. The jaws 136 and the casing 140 are then returned to the extended position, the swing arm assembly 19 is rotated to place the gripping devices 18 in the horizontal position, and the swing arm assembly 19 is returned to the sole gripping position (FIG. 13). This cycle is repeated indefinitely.

Turret Assembly

Figure 18:
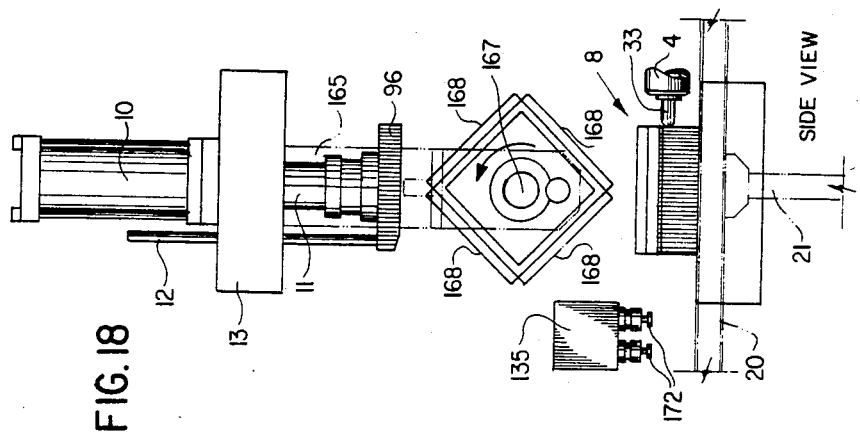
FIGS. 17 and 18 are schematic elevation views of the structure of FIG. 16.
Figure 17:
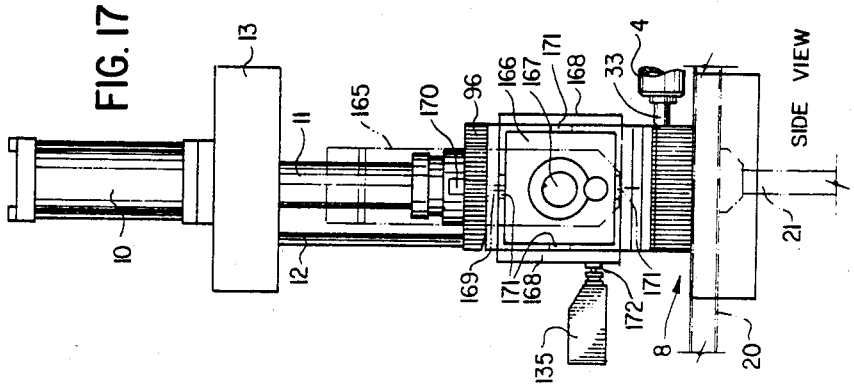
Figure 16:
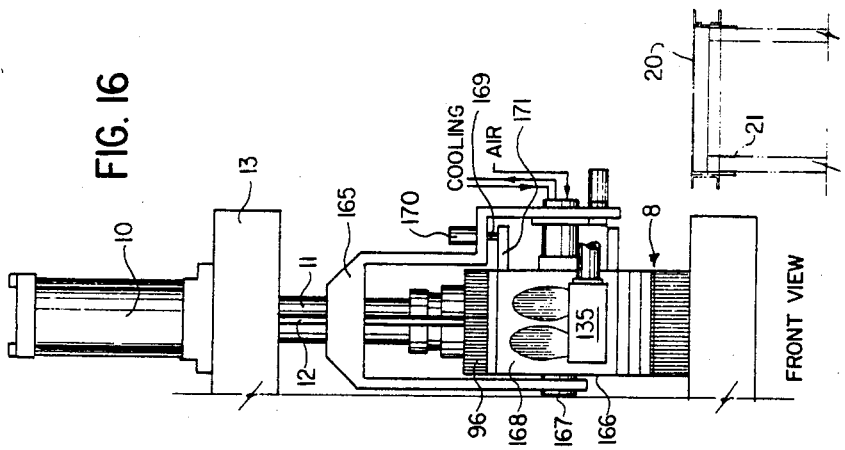
FIG. 16 is a schematic front view of an alternate mold structure for use in the machine of FIGS. 1 to 3.

An alternative to the top mold assembly 7 is shown in FIGS. 16 to 18 of the drawings where, whenever possible the reference numerals of FIGS. 1 to 15 are used to identify the same or similar elements.

The turret assembly of FIGS. 16 to 18 includes a yoke 165 carrying a square top mold assembly defined by a square turret 166. The yoke 165 is slidably mounted on the piston rod 11. The turret 166 is mounted on a shaft 167 in the yoke 165 for rotation around a horizontal axis. The turret 166 includes a top mold 168 on each surface thereof. Cooling plates (not shown) and air ejectors are built into the turret 166 for ejecting soles from each surface of the turret. Following each 90° rotation of the turret 166, the turret is locked in position by a piston rod 169, which extends outwardly from a cylinder 170 on the yoke 165 into an aperture in an arm 171 on the turret 166. In this embodiment of the invention, the gripping device jaws are replace by suction heads 172, because this embodiment of the invention is intended for the production of thin soles without hollow heels.

In operation, the turret 166 is moved against the bottom mold assembly 8 to form mold cavities (not shown), soles are molded (FIG. 17), and the piston rod 11 and movable top platen 96 are raised. As the top platen 96 rises, it engages the yoke 165, carrying the yoke 165 and the turret 166 upwardly to create a gap between the turret 166 and the bottom mold assembly 8. Near the top of the stroke of the piston rod 11, the yoke engages the bottom surface of the top fixed platen 13. The movable platen 96 continues to rise while the turret 166 remains in one position. Thus, a gap is created between the top of the turret 166 and the platen 96. With this arrangement, the turret 166 can be rotated in the yoke 165 to present a second top mold 168 to the bottom mold assembly 8. The platen 96, yoke 165 and turret 166 are lowered and a second molding operation is carried out. The cycle is repeated until the fourth molding operation at which time the first soles oppose the suction heads 172. While the fourth molding operation is being effected, the first pair of soles is removed from the turret 166. Thereafter, the molding and sole removal operations are continuous.

I claim:
1. A method of producing a footwear sole comprising the steps of:
   (a) forming a mold cavity by moving a top mold assembly downwardly against a bottom mold assembly;
   (b) injecting plastic material into said mold cavity to form the sole;
   (c) opening the mold cavity by moving the top mold assembly upwardly away from the bottom mold assembly with the sole attached to said top mold assembly;
   (d) swinging at least a portion of the top mold assembly downwardly around a horizontal axis to present the sole in a substantially vertical position for removal from the top mold assembly;
   (e) gripping said sole to remove the sole from the top mold assembly;
   (f) rotating said sole through approximately 180° around a vertical axis away from said top mold assembly;
   (g) rotating said sole through approximately 90° around a horizontal axis to a discharge position; and
   (h) releasing said sole, whereby the sole is discharged for further processing or packaging.

2. A machine for molding footwear soles comprising:
   (a) frame means for carrying a plastic extruder;
   (b) bottom mold means mounted on said frame means;
   (c) movable top mold means mounted on said frame means for cooperating with said bottom mold means to define a mold cavity for receiving plastic from said extruder for forming a footwear sole;
   (d) means for moving said top mold means between a closed cavity forming position and an open position in which the molded sole is retained by said top mold means;
   (e) first swing means for swinging said top mold means between the open position and an unloading position;
   (f) gripper means for gripping and removing a sole from said top mold means; and
   (g) transfer means carrying said gripper means, said transfer means including
      (i) arm means carrying said gripper means for moving said gripper means between said unloading position and a sole discharge position;
      (ii) second swing means for swinging said arm means around a vertical axis for moving the gripper means and a sole away from the top mold means, and
      (iii) rotary means for rotating said arm means around a horizontal axis for moving the gripper means and sole to the discharge position.

3. A machine according to claim 2, wherein said top mold means includes turret means carrying a plurality of top molds; and yoke means rotatably supporting said turret means for presenting said top molds to said bottom mold means in succession, whereby a plurality of soles can be molded relatively quickly.

4. A machine according to claim 2, including a clamping cylinder for moving top mold means between said closed and open positions; said top mold means including movable platen means connected to said clamping cylinder; a top mold connected to said movable platen for closing on said bottom mold means; swing means for swinging said top mold between a horizontal molding position and a substantially vertical unloading position for facilitating gripping of the sole by said gripper means.

5. A machine according to claim 4, wherein said gripper means includes first casing means; a pair of opposed jaws projecting out of one end of said first casing means for gripping a sole; plunger means in said first casing means for closing said opposed jaws; second casing means slidably supporting said first casing means; and drive means in said second casing means for moving said first casing means in said second casing means, whereby said jaws are moved between a sole engaging extended position and a retracted sole removing position.

6. A machine according to claim 2, including hot runner means attached to said bottom mold means for conveying thermoplastic material from said extruder to said mold cavity; said hot runner means maintaining said thermoplastic material in the fused state until the material enters said mold cavity.

7. A machine according to claim 6, wherein said hot runner means includes a casing for supporting said bottom mold means; a manifold mounted in said casing; a nozzle assembly on said casing for introducing thermoplastic material into said mold cavity; passage means in said manifold for conveying the thermoplastic material from the extruder to said nozzle assembly; and heating means for heating said manifold and said nozzle assembly.

8. A machine according to claim 7, including valve means normally closing said nozzle assembly.

9. A machine according to claim 7, including stop means in said casing for counteracting thermal expansion of said manifold to prevent misalignment of said nozzle assembly with respect to said mold cavities.

* * * * *